US010507728B2

(12) United States Patent
Raab et al.

(10) Patent No.: US 10,507,728 B2
(45) Date of Patent: Dec. 17, 2019

(54) AUXILIARY DRIVE OF A COMBUSTION MACHINE

(71) Applicant: MAN Truck & Bus Österreich GesmbH, Steyr (AT)

(72) Inventors: Gottfried Raab, Perg (AT); Josef Klammer, Steyr (AT); Ewald Hundsberger, Aschach an der Steyr (AT)

(73) Assignee: MAN TRUCK & BUS ÖSTERREICH GESMBH, Steyr (AT)

( * ) Notice: Subject to any disclaimer, the term of this patent is extended or adjusted under 35 U.S.C. 154(b) by 180 days.

(21) Appl. No.: 15/463,565

(22) Filed: Mar. 20, 2017

(65) Prior Publication Data

US 2017/0274767 A1 Sep. 28, 2017

(30) Foreign Application Priority Data

Mar. 22, 2016 (AT) .................................. A 152/2016

(51) Int. Cl.
B60K 25/02 (2006.01)
B60K 6/40 (2007.10)
B60K 17/28 (2006.01)
F02B 67/04 (2006.01)

(52) U.S. Cl.
CPC ............... *B60K 25/02* (2013.01); *B60K 6/40* (2013.01); *B60K 17/28* (2013.01); *F02B 67/04* (2013.01); *B60K 2025/022* (2013.01); *B60Y 2400/795* (2013.01); *B60Y 2410/102* (2013.01)

(58) Field of Classification Search
CPC ...................................................... B60K 5/04
See application file for complete search history.

(56) References Cited

U.S. PATENT DOCUMENTS

| 2,197,179 | A |  | 4/1940 | Hersey |
| 2,912,963 | A |  | 11/1959 | Dufresne |
| 3,272,188 | A |  | 9/1966 | Sabat |
| 5,404,852 | A |  | 4/1995 | Frankle |
| 5,729,978 | A | * | 3/1998 | Hiereth ................. F02B 37/105 60/607 |
| 6,050,239 | A |  | 4/2000 | Frankle et al. |

(Continued)

FOREIGN PATENT DOCUMENTS

| DE | 1027941 B | 4/1958 |
| DE | 3118269 A1 | 4/1982 |

(Continued)

OTHER PUBLICATIONS

First Austrian Office Action issued in corresponding application No. A152/2016 dated Sep. 29, 2016.

(Continued)

*Primary Examiner* — Nicole T Verley
(74) *Attorney, Agent, or Firm* — Weber Rosselli & Cannon LLP

(57) ABSTRACT

The present disclosure relates to an auxiliary drive of a combustion machine, in particular of a combustion machine of a utility vehicle. The auxiliary drive includes a shaft which is operatively connected to a crankshaft of the combustion machine and which has two shaft ends which are designed in each case for connection to a power-outputting and/or power-receiving machine arranged outside the crankcase.

18 Claims, 6 Drawing Sheets

(56) References Cited

U.S. PATENT DOCUMENTS

| | | | |
|---|---|---|---|
| 6,763,798 B2 | 7/2004 | Moller et al. | |
| 2002/0012593 A1 | 1/2002 | Okuda | |
| 2002/0124827 A1 | 9/2002 | Moller et al. | |
| 2003/0145822 A9 | 8/2003 | Moller et al. | |
| 2015/0360554 A1* | 12/2015 | Piazza | B60K 6/445 475/5 |
| 2016/0053678 A1* | 2/2016 | Remboski | F01K 3/10 60/620 |
| 2017/0129323 A1* | 5/2017 | Fremau | B60K 6/442 |
| 2018/0313233 A1* | 11/2018 | Tateno | F01K 15/02 |

FOREIGN PATENT DOCUMENTS

| | | |
|---|---|---|
| DE | 4309860 C1 | 6/1994 |
| DE | 4429855 C1 | 8/1995 |
| DE | 19735822 C1 | 10/1998 |
| DE | 19902052 C2 | 2/2001 |
| DE | 10135363 A1 | 1/2003 |
| DE | 102013000495 B3 | 3/2014 |
| EP | 1174605 A2 | 1/2002 |
| GB | 206845 A | 2/1924 |
| GB | 644096 A | 10/1950 |
| GB | 737159 A | 9/1955 |
| GB | 824783 A | 12/1959 |
| JP | S51154601 U | 12/1976 |
| JP | S64323 A | 1/1989 |
| JP | 2007-016729 A | 1/2007 |
| JP | 2009-197583 A | 9/2009 |

OTHER PUBLICATIONS

Extended European Search Report issued in corresponding European application No. 17157663.0 dated Sep. 4, 2017.

* cited by examiner

AUXILIARY DRIVE OF A COMBUSTION MACHINE

BACKGROUND

1. Technical Field

The present disclosure relates to an auxiliary drive of a combustion machine, in particular of a combustion machine of a utility vehicle.

2. Description of Related Art

Combustion machines of utility vehicles often have a power take-off which serves for the drive of appliances or auxiliary assemblies. For this purpose, it is known for a shaft of the auxiliary drive to be driven by a crankshaft of the combustion machine via intermediate gears. For example, the laid-open specification EP 1 174 605 A2 has disclosed for example an auxiliary drive of a combustion machine comprising a shaft which is guided in a case by way of radial and axial bearings and which is connected rotationally conjointly to a gearwheel, wherein said gearwheel can be driven by a crankshaft of the combustion machine via intermediate gears, and the shaft, at its free end, has a drive-output flange, which is connected rotationally conjointly to the shaft, for the purposes of driving working machines. Here, the shaft is integrated with the radial and axial bearings and the gearwheel into the crankcase of the combustion machine, wherein the gearwheel is arranged so as to be situated directly between the radial bearings.

It is also known that modern combustion machines have numerous auxiliary assemblies. Aside from auxiliary assemblies which are directly required for the operation of the vehicle engine, such as for example alternator, water pump or compressor, increasing use is being made of auxiliary assemblies which are intended two improve the comfort of the vehicle, for example air-conditioning compressors, steering assistance pumps etc. Normally, said auxiliary assemblies are fastened to the vehicle engine and are driven by the latter via chain drives, belt drives, gearwheel drives or a combination of these. The greater the number of auxiliary assemblies provided in a vehicle, the more difficult it becomes in spatial terms for these to be fastened in a suitable manner to the vehicle engine, and the more cumbersome and complicated the required drives become. Such a multiplicity of auxiliary assemblies and belt drives or the like poses difficulties not only owing to the engine bay, which nowadays is generally of very tight dimensions.

FIG. 1 shows a perspective view of an arrangement 10, known from the prior art, of auxiliary assemblies of an internal combustion engine. This is an internal combustion engine 1, in the form of a diesel combustion machine, of a utility vehicle. The internal combustion engine 1 is closed off at the bottom by an oil sump 19. The top side of the internal combustion engine 1 is denoted by the reference designation 5. On the front face side 4 of the internal combustion engine 1 there is situated a belt mechanism 6, hereinafter referred to for short as belt drive, which is driven by the combustion machine. In the perspective view of FIG. 1, the reference designation 6b denotes the belt, and the reference designation 6a denotes a drive belt pulley. In a known manner, the belt drive drives a 24 V generator (alternator) 11, a water pump 12 and a refrigerant compressor 13 of the air-conditioning system. The water pump 12 and refrigerant compressor 13 are likewise arranged, behind the fan 7, on the front face side 4, but on the rear part (not shown in FIG. 1) of the front face side 4, and thus on that side of the front face side 4 which is situated opposite the generator 11.

Also situated on the front face side 4 is a front gear drive (gearwheel mechanism) which is driven by the combustion machine and the gearwheels of which are encased by the control case 51 and which are thus not visible in the illustration of FIG. 1. The front gear drive drives the fan 7 arranged on the front face side 4, a high-pressure fuel pump 15 arranged laterally on the crankcase 2, and an oil pump. Furthermore, a rear gear drive is provided, that is to say a gear drive which is arranged on the gearbox-side face side 3 of the internal combustion engine 1, which gear drive is driven by the internal combustion engine. The rear gear drive is encased by the control case 52, and is therefore not visible in the illustration of FIG. 1. The crankcase 2 is open to the face sides 3, 4, and is closed off at the face sides by the control cases 51, 52, in which the gear drives are accommodated.

The rear gear drive drives an air compressor 14, also referred to as air impeller, which is in the form of a piston-type compressor. The air compressor 14 supplies compressed air to a compressed-air system of the utility vehicle. The air compressor is fastened to a lower rear section of the lateral wall of the crankcase. At this location, an opening is provided in the crankcase 2, via which opening the power flow between compressed-air compressor 4 and the rear gear drive is realized.

The rear gear drive furthermore drives a steering assistance pump which is arranged on the air compressor 14. The rear gear drive output furthermore, in a known manner, drives the camshaft drive input, and has an auxiliary drive (power take-off) for the drive of, for example, a hydraulic pump for body systems of the utility vehicle (in each case not illustrated).

By way of such a design, the available free structural space is virtually fully utilized for the arrangement of auxiliary assemblies such as are required for conventionally equipped motor vehicles. Problems however arise in the case of equipment with further auxiliary assemblies, for example if the utility vehicle is to be equipped with a system for waste heat recovery (WHR), in the case of which, for example, it is sought to use an expansion machine.

SUMMARY

Against this background, the present disclosure is based on the object of providing a possibility for the arrangement of auxiliary assemblies in a combustion machine, by way of which the disadvantages of conventional arrangements can be avoided. The present disclosure is based in particular on the object of providing an arrangement of auxiliary assemblies in a combustion machine, which arrangement takes up little structural space and permits a modification of a combustion machine for applications with additional auxiliary assemblies with little outlay.

Said objects are achieved by way of an auxiliary drive having the features of the independent claim. Advantageous embodiments and uses of the present disclosure are the subject of the dependent claims, and will be discussed in more detail in the following description, in part with reference to the figures.

According to general aspects of the present disclosure, an auxiliary drive of a combustion machine is provided, having a shaft which is operatively connected to a crankshaft of the combustion machine and which has two shaft ends, in particular two free shaft ends, which are designed in each case for connection to a power-outputting and/or power-receiving machine, in particular a power-outputting and/or power-receiving machine arranged outside the crankcase.

In other words, the shaft has a first shaft end which is arranged so as to be connectable to a first power-outputting and/or power-receiving first machine arranged outside the crankcase. Furthermore, the shaft has a second shaft end which is arranged so as to be connectable to a power-outputting and/or power-receiving second machine arranged outside the crankcase. The two machines can thus be placed in operative connection with the shaft in alignment with one another at oppositely situated ends of the shaft. At a location arranged offset from the shaft ends in an axial direction, the shaft is operatively connected to the combustion machine. The auxiliary drive thus forms, by way of the shaft, a T-shaped power branch.

The expression "auxiliary drive" is to be understood to mean an auxiliary drive input and/or a power take-off. The auxiliary drive may function as a power take-off for the purposes of driving one or more auxiliary assemblies. Here, a power flow is directed out of the combustion machine via the auxiliary drive. The auxiliary drive may also function as an auxiliary drive input, wherein a power flow flows to the combustion machine via the auxiliary drive. In the context of this present disclosure, an auxiliary drive thus constitutes an interface on the combustion machine, for example on the internal combustion engine, via which an auxiliary assembly or other unit is mechanically operatively connectable to the combustion machine in order, for example, to be driven by the crankshaft or in order to supply mechanical energy to the crankshaft.

One advantage of the auxiliary drive according to the present disclosure thus lies in the fact that the shaft has not just one free end but two free ends, such that not just one but two power-outputting and/or power-receiving machines can be placed in operative connection with the crankshaft of the combustion machine via the shaft. This is particularly advantageous for vehicles which have an expansion machine of a waste heat recovery system for converting waste heat of the combustion machine or of an engine braking system into utilizable energy, as will be discussed in yet more detail below.

The shaft may advantageously be arranged laterally on the combustion machine, in particular on a gearbox-side lateral end region of the combustion machine.

In a one embodiment, the auxiliary drive has a case in which the shaft is mounted. In one variant of said embodiment, said case may be fastened to the crankcase, in particular to an outer side of the crankcase, or may be formed as part of the crankcase. The case may for example be fastened laterally to the outside of the crankcase. In another variant, said case may be fastened to a control case or may be formed as part of the control case. As already mentioned, a "control case" refers to a case in which a gear drive operatively connected to the internal combustion engine is arranged. The crankcase is normally open toward one face side. The control case is arranged on the face side and thus closes off the crankcase at a face side. The control case may be the rear control case, in which the rear, that is to say gearbox-side, gear drive is accommodated. Said case may furthermore be fastened both to the crankcase and to the control case. The shaft is thus fastened by way of said case to the crankcase and/or control case. The case will therefore be referred to hereinafter as intermediate case. Said variants offer the advantage that existing shapes and embodiments of the crankcase do not need to be modified for the arrangement of the shaft. Instead, a separate intermediate case is fastened to the outside of the crankcase or control case.

In a further embodiment, it is however also possible for the shaft to be mounted in a case section of the crankcase.

In accordance with another possibility, the shaft may be mounted in a case section of the control case. The control case may be the control case in which the rear, that is to say gearbox-side, gear drive, which is operatively connected to the combustion machine, is mounted. These variants offer the advantage that a separate intermediate case can be dispensed with.

The case section and the intermediate case may, in the region of the shaft ends, have in each case one opening for the connection of a machine, which is arranged outside and/or on the crankcase, to one of the shaft ends.

The intermediate case may be arranged on a lateral wall of the crankcase of the combustion machine or on the rear, that is to say gearbox-side, face side of the internal combustion engine. The two lateral walls of the crankcase run between the two face surfaces and are led in a vertical direction toward an oil sump which is provided at a lower region of the crankcase. It is furthermore preferably possible for the intermediate case to be arranged on a gearbox-side lateral end region of the crankcase of the combustion machine, in particular on a gearbox-side region of the lateral wall of the crankcase or control case. By way of this arrangement, the shaft can be connected for example to a rear gear drive, which is operatively connected to the crankshaft, of the combustion machine.

Furthermore, the shaft may be mounted in the intermediate case or the case section by way of at least one radial and/or at least one axial bearing. The radial and/or axial bearings accommodate the radial and/or axial forces acting on the shaft, which forces are caused for example by the mechanical operative connection of the shaft to the gear drive. By way of such an arrangement, the normally service-life-limiting forces on the bearings of the auxiliary assemblies can be reduced or eliminated.

According to a further possible aspect of the present disclosure, on opposite face sides of the intermediate case or of the case section, there may be provided in each case one fastening interface for the rotationally secured fastening of a case of the power-outputting and/or power-receiving machine. Each fastening interface is thus assigned to a shaft end. The face sides of the intermediate case are assigned to in each case one of the free shaft ends and are substantially perpendicular to the axis of rotation of the shaft. The intermediate case can thus perform multiple functions: the intermediate case may serve for receiving the shaft in mounted fashion and for the fastening of the machine cases of the machines operatively connected to the shaft, and for protecting the shaft against fouling and mechanical damage, and in the simultaneous design as a control case, may encase the rear gear drive and the flywheel.

Furthermore, the intermediate case or the case section may have in each case one opening in the region of the shaft ends, such that a power-outputting and/or power-receiving machine arranged outside the intermediate case and/or case section can be placed in operative connection with a shaft end of the shaft via an opening of said type.

For example, at least one of the shaft ends may be operatively connected to an expansion machine, in particular an expansion machine which is part of a waste heat recovery system for converting waste heat of the combustion machine or of an engine braking system into utilizable energy, preferably by way of a steam circuit. In the case of a waste heat recovery system of said type, a circuit medium is, with the aid of a steam circuit, for example of an ORC (Organic Rankine Cycle) process, brought to a high pressure level, evaporated in an evaporator, and superheated. Said steam is supplied to an expansion machine which converts the energy stored in the steam into utilizable energy. Downstream of the expansion machine, the steam is liquefied again and is supplied to a feed pump.

Furthermore, one of the shaft ends may be operatively connected to an electric machine which is operable as a motor and/or as a generator, for example to a motor/generator which is operable with an operating voltage 12 V, 24 V, 48 V or high voltage (e.g. 400 V) and which is electrically connected to an on-board electrical system of the vehicle. One of the free shaft ends may also remain free, that is to say may be unequipped.

Furthermore, it is possible for both shaft ends to be connected to an electric machine which is operable as a generator and preferably also as a motor.

In accordance with on embodiment one of the shaft ends is operatively connected to an expansion machine and the other shaft end is operatively connected to an electric machine which is operable as a motor and as a generator. If both the expansion machine and the motor/generator are connected to the shaft, this arrangement offers the advantage that the expansion machine and the generator are operatively connectable both to one another and in each case to the internal combustion engine via the shaft, in order to permit selective electrical utilization and mechanical utilization of the energy of the expansion machine. An advantage of the present disclosure thus lies in the fact that, with the auxiliary drive interface according to the present disclosure, different equipment variants can be realized. For example, for vehicle variants which are to be equipped with a waste heat recovery system using a steam circuit, it is possible for one end of the shaft to be equipped with an expansion machine while the other end is equipped with a motor/generator. Here, the motor/generator may, according to market demand, be selectively designed as a generator or motor/generator with 12 V operating voltage, 24 V operating voltage, 48 V operating voltage or as a motor/generator with high operating voltage (e.g. 400 V) or some other operating voltage. For vehicle variants which are not intended to comprise a waste heat recovery system, it is possible for one of the free ends to remain free, and for the other to be equipped with the motor/generator. For applications with a high electrical demand, for example in the case of buses, it is also possible for in each case one generator or motor/generator to be connected to each free end of the shaft.

In the context of the present disclosure, it is furthermore possible for at least one coupling or one active or passive switching element to be provided in order to selectively produce or eliminate the operative connection between the machine connected to one free end and the machine connected to the other free end and/or in order to selectively produce or eliminate the operative connection of the shaft to the internal combustion engine. Alternatively, it is possible for no such coupling or no switching element to be provided, such that the shaft is operatively connected fixedly and/or non-switchably, in particular permanently, to the internal combustion engine, and/or that the machines connected to both free ends are operatively connected fixedly and/or non-switchably, in particular permanently.

The shaft may be arranged such that its axis of rotation runs parallel or substantially parallel to the crankshaft axis. The free shaft ends may, for the connection to in each case one power-outputting and/or power-receiving machine, have in each case one expediently designed connection element. The connection element may for example be in the form of a connecting flange, internal teeth, external teeth, frustum, splined shaft profile, toothed shaft profile or any other shaft-hub connection.

The shaft may be connected rotationally conjointly to a gearwheel, wherein the gearwheel can be driven by the crankshaft of the combustion machine via intermediate gears. The shaft may in particular be operatively connected to the crankshaft via a gear drive. The gear drive may be arranged on a gearbox-side end region of the combustion machine. The operative connection of the shaft to the gearwheel and/or to the gear drive is preferably realized at a shaft section which is spaced apart from the free ends of the shaft.

Said gear drive of the combustion machine may furthermore be operatively connected to a steering assistance pump, to a further power take-off, to an oil pump, to a high-pressure fuel pump and to a camshaft drive input.

In a further variant, the shaft is arranged on a cold side of the combustion machine. This is particularly advantageous if the expansion machine is connected to a free shaft end of the shaft, because WHR circuits normally operate with a flammable fluid, for example ethanol, such that, in the event of a leakage, said fluid does not pass directly to the hot side of the engine. As is known, combustion machines have a hot side, which during the operation of the combustion machine is at a higher temperature than the cold side. The hot side of the combustion machine is for example that side of the combustion machine at which an exhaust manifold is arranged. It is also possible for the exhaust-gas turbocharger to be arranged on the hot side. In the case of a utility vehicle, the charge-air line and/or the engine control unit are typically arranged on the cold side.

For reasons relating to structural space, in particular in a utility vehicle, it is advantageous for the shaft and/or the intermediate case to be arranged in a particular angle range on the crankcase, wherein an angle is measured as viewed in the direction of the combustion machine proceeding from a rear face side of the crankcase and upward clockwise proceeding from an angle of 0° at the bottom side of the crankcase. In other words, the angle range illustrated in FIG. 3 is described with reference to a situation in which the internal combustion engine is viewed from the rear (gearbox side). The angle is thus measured in relation to a vertical plane parallel to the crankshaft, such that the angle range from 0° to 360° spans a circle perpendicular to said vertical plane. An angle of 0° thus corresponds to an arrangement at the bottom and in the centre on the crankcase; an angle of 180° corresponds to an arrangement at the top in the centre on the crankcase; and an angle of 90° or 270° or −90° corresponds to an arrangement on the lateral wall of the crankcase.

An advantageous location for arrangement of the intermediate case and/or the shaft is on the lateral wall of the crankcase in an angle range from 110° to 160° or from 200° to 250°, because here, the structural space in a utility vehicle engine is not taken up by a vehicle frame or the vehicle axle, and the arrangement also does not restrict the ground clearance.

The present disclosure also relates to a motor vehicle, in particular a utility vehicle, having an arrangement of auxiliary assemblies as described in this document.

BRIEF DESCRIPTION OF THE DRAWINGS

The embodiments and features of the present disclosure described above may be combined with one another in any desired manner. Further details and advantages of the present disclosure will be described below with reference to the appended drawings, in which.

DETAILED DESCRIPTION

Identical or functionally equivalent elements are denoted by the same reference designations throughout the figures.

Figure 1:
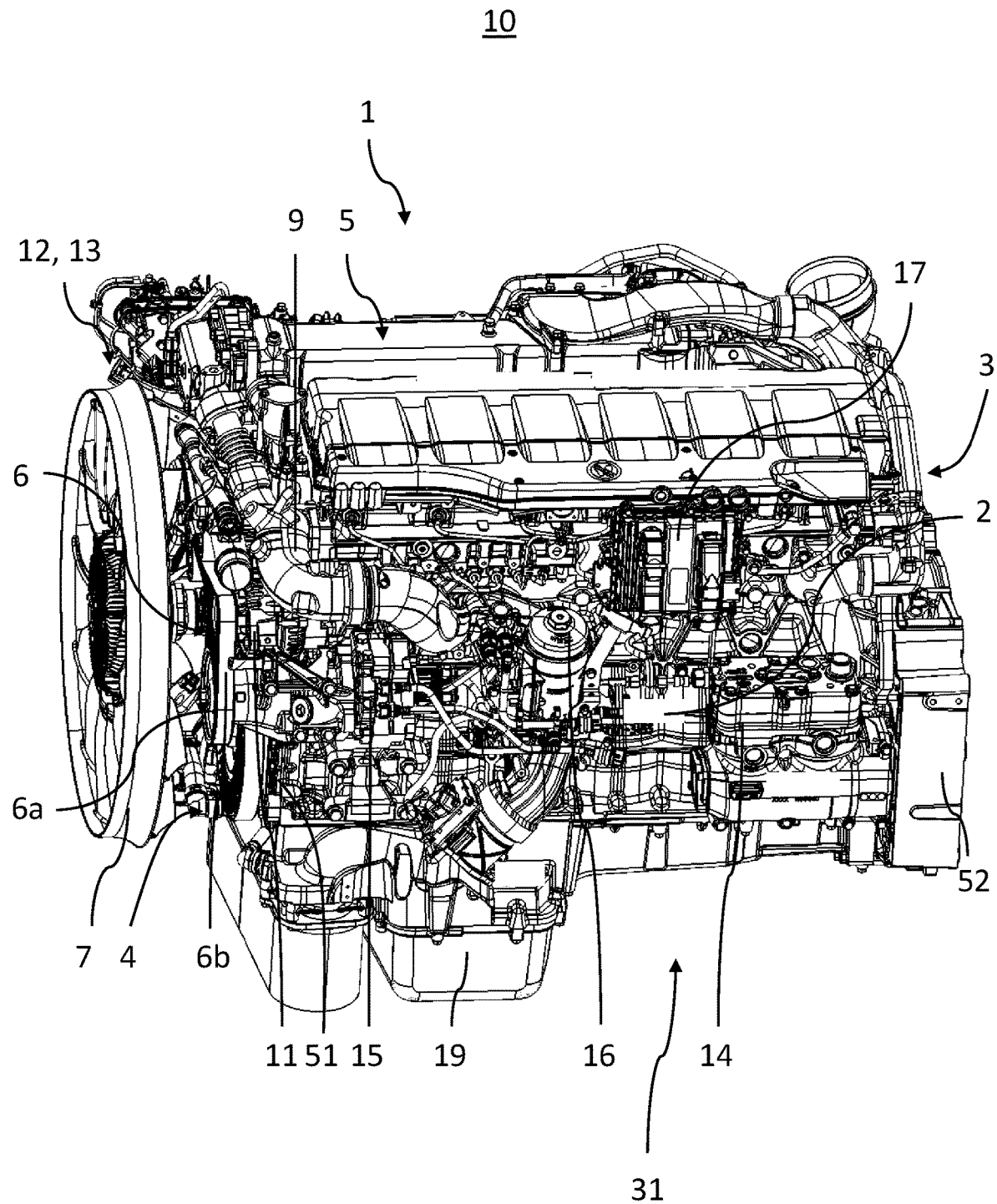
FIG. 1 shows a perspective view of an arrangement of auxiliary assemblies known from the prior art on an internal combustion engine of a utility vehicle.
Figure 2:
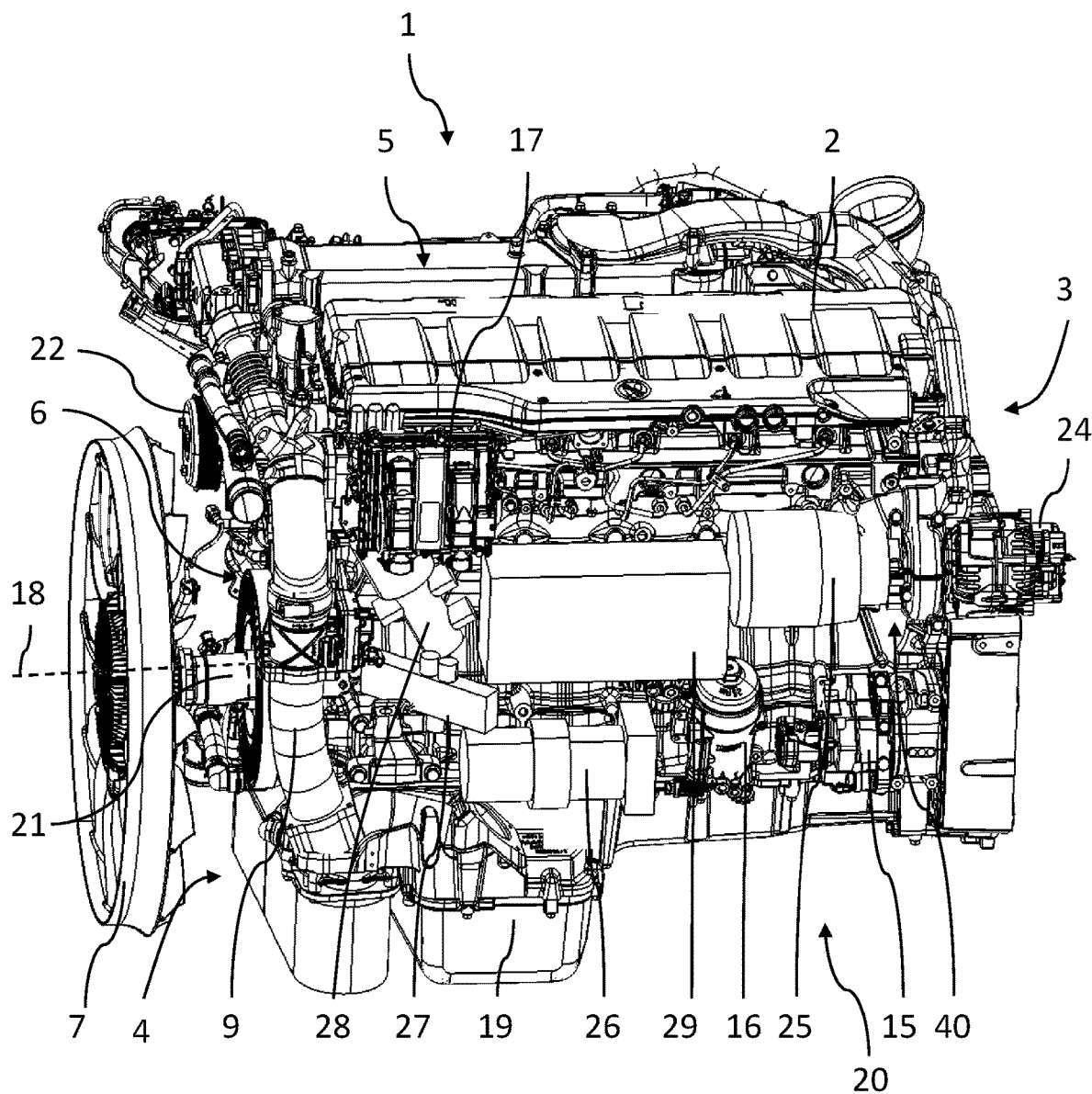
FIG. 2 shows a perspective view of an arrangement of auxiliary assemblies on an internal combustion engine of a utility vehicle having an auxiliary drive as per an exemplary embodiment of the present disclosure.

FIG. 2 shows a perspective view of an arrangement 20 of auxiliary assemblies on an internal combustion engine 1 of a utility vehicle as per an exemplary embodiment of the present disclosure. The internal combustion engine 1 is in the form of a diesel combustion machine. The top side of the internal combustion engine 1 is, as in FIG. 1, denoted by the reference designation 5, the front face side is denoted by the reference designation 4, and the rear, gearbox-side face side is denoted by the reference designation 3. The illustrated arrangement 20 of auxiliary assemblies is formed without a belt drive, that is to say so as to be free of a belt drive. The front gear drive has also been omitted in relation to the arrangement shown in FIG. 1.

By way of example, proceeding from the known arrangement illustrated in FIG. 1, the omission of the belt drive has been made possible by virtue of the components that were hitherto driven by the belt drive being electrified or being relocated into the rear gear drive. The generator 24 is now driven by the rear gear drive, wherein the generator 24 may also, in comparison with the generator 14 of FIG. 1, be designed as a motor/generator with 12 V, 24 V, 48 V or high-voltage (e.g. 400 V) operating voltage. The generator 24 is thus operable not only as a generator but also as a motor, and for this purpose, can be supplied with electrical energy for the motor operation from an electrical energy accumulator of an on-board electrical system (in each case not illustrated). The rear gear drive, which may be designed in a manner known per se, is situated in the region of the rear face side 3 and is encased by the control case 52, and is therefore not visible in the illustration of FIG. 2.

The water pump 22 is, as an electrified component, configured with a 48 V operating voltage, and is arranged, fixedly with respect to the engine, on the engine front side 4. The refrigerant compressor (not illustrated in FIG. 2) is likewise designed as an electrified component with 48 V operating voltage, and can thereby be installed fixedly with respect to a frame. The refrigerant compressor installed on the vehicle frame is not illustrated in FIG. 2. The steering assistance pump (not illustrated in FIG. 2) is likewise designed as an electrified component with 48 V operating voltage, and can thereby be installed fixedly with respect to the frame. The steering assistance pump installed in the vehicle frame is not illustrated in FIG. 2.

By way of example, proceeding from the known arrangement illustrated in FIG. 1, the omission of the front gear drive in the design variant shown in FIG. 2 is made possible by virtue of the components that were hitherto driven by the front gear drive being relocated into the rear gear drive—with the exception of the fan 7, which is arranged coaxially and rotationally conjointly with respect to the crankshaft on a crankshaft stub 21. The dashed line 18 indicates the central axis of the crankshaft. The high-pressure fuel pump 15 and the oil pump are driven mechanically by the rear gear drive. The oil pump may additionally be electrically driven and thus partially electrified. The rear gear drive furthermore, in a manner known per se, drives a camshaft drive input (in each case not illustrated). The rear gear drive furthermore has a power take-off (not illustrated) for the drive of, for example, a hydraulic pump for body systems of the utility vehicle.

A special feature of the arrangement 20 lies in the fact that the piston-type air impeller from FIG. 1 has been replaced with a compressor device for generating compressed air for a compressed-air system, in the case of which at least one cylinder of the combustion machine has a controllable valve arranged in the cylinder head, by way of which valve, when it is in an open state, a connection can be produced from the combustion chamber of the at least one cylinder to a compressed-air system and compressed gas from the combustion chamber can be supplied to a compressed-air accumulator of the compressed-air system. A compressor device which extracts compressed air from a cylinder of the combustion machine in targeted fashion for the purposes of compressed-air generation is known per se from the prior art, and therefore will not be described in any more detail at this juncture. By way of example, reference is made to the documents DE 199 02 052 C2, DE 197 35 822 C1, DE 101 35 363 A1, DE 4 3 09 860 C1 or DE 31 18 269 A1, which describe generic compressor devices.

At the auxiliary drive interface thereby freed up, there is provided a shaft 42, which is arranged on the combustion machine, as part of an auxiliary drive 40. On the shaft there are arranged a 48 V motor/generator 24 and an expansion machine 25, as will be described below in even more detail in conjunction with the description of FIG. 4.

The view in FIG. 2 shows the cold side 31 of the combustion engine 1, with the engine control unit 17, the charge-air duct 9, a fuel module 16 and the auxiliary drive 40, on which for example a motor/generator 24 and an expansion machine 25 are arranged. Various components for assisting the supply of fuel, such as for example a fuel filter and pressure regulator, are integrated in the fuel module 16. On the cold side, aside from the expansion machine 25, there are arranged further components known per se of a steam circuit, specifically a feed pump 26, a distributor valve 27, a bypass valve 28 and a condenser 29, which are each fastened to the crankcase 2.

Figure 3:
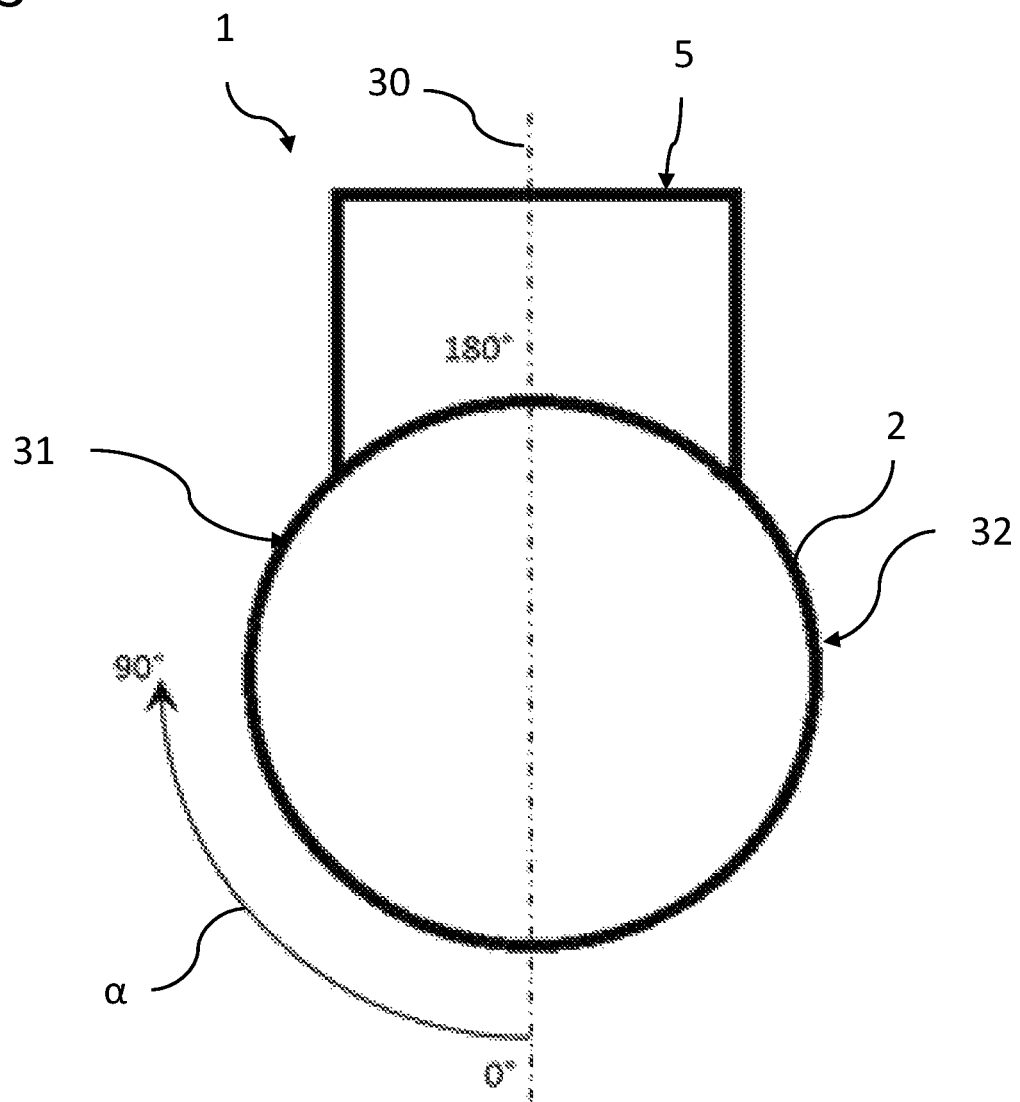
FIG. 3 shows a rear-side frontal view of the internal combustion engine for the illustration of angle ranges.

FIG. 3 shows a rear-side frontal view of the internal combustion engine for the purposes of illustrating angle ranges in which the auxiliary assemblies are arranged. For the definition of an angle range, and angle α is measured, as viewed in the direction of the combustion machine 1 from a rear face side (gearbox side) of the crankcase 2, upward clockwise proceeding from an angle of 0° at the bottom side of the crankcase. The following optional angle ranges of the component arrangement are therefore described with reference to a situation in which the internal combustion engine is viewed from the rear (gearbox side). The angle is thus measured in relation to a vertical plane 30 parallel to the crankshaft, such that the angle range from 0° to 360° spans a circle perpendicular to said vertical plane. In the example shown, the side 31 is the cold side and the side 32 is the hot side of the internal combustion engine.

The auxiliary drive 40 (with the machines motor/generator 24 and expansion machine 25 mounted thereon by way of example) is arranged on the lateral wall of the crankcase on the cold side 31 in an angle range from 110° to 160°. The fuel pump 15 is arranged on the cold side 31 in an angle range from 60° to 120°. The oil pump is arranged in the lower region of the crankcase in an angle range from −90° to 90°. If the cold and hot sides were interchanged, the motor/generator would correspondingly be arranged in an angle range from 200° to 250°, and the fuel pump would be arranged in a range from 240° to 300°, laterally on the crankcase.

Figure 4:
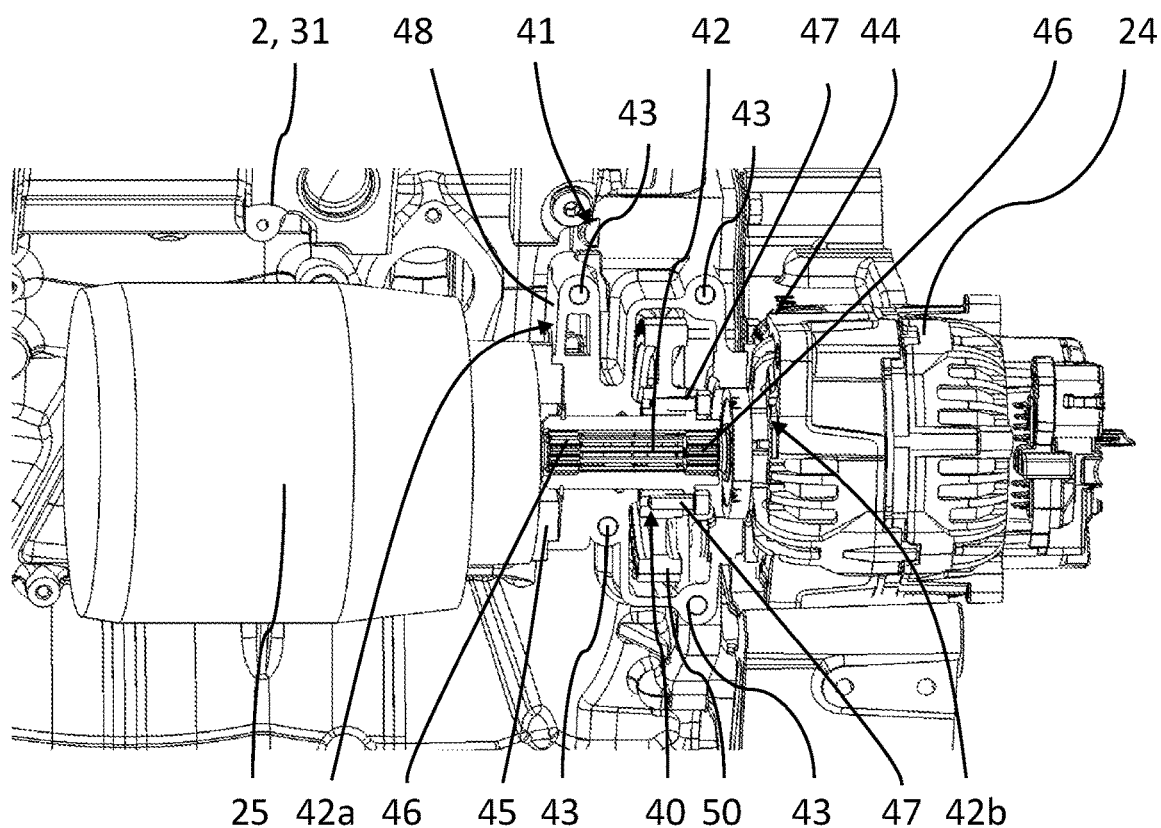
FIG. 4 shows a detail view of an auxiliary drive as per an embodiment of the present disclosure.

FIG. 4 shows a detailed view of an auxiliary drive 40 as per an embodiment of the present disclosure, wherein only the auxiliary drive 40 is illustrated in a sectional view. It has already been mentioned above that an auxiliary drive interface, on which an air compressor is arranged in the case of an internal combustion engine known from the prior art (see FIG. 1), is now utilized for the arrangement of a shaft 42 which has two free shaft ends 42a, 42b which are designed in each case for connection to a power-outputting and/or power-receiving machine 24, 25. The axis of rotation of the shaft 42 runs parallel to the crankshaft axis of rotation 18.

The free shaft ends 42a, 42b may, for connection to in each case one power-outputting and/or power-receiving machine 24, 25, have for example a connecting flange, an internal teeth, and external teeth, a frustum, a splined shaft profile, a toothed shaft profile or similar interfaces for the shaft-hub connection. In the example shown, the shaft 42 is in the form of an internally toothed shaft, such that the power-outputting and/or power-receiving machines 24, 25 are operatively connected by way of an external teeth 46 to the shaft 42.

The in-feed of power into and/or extraction of power from the shaft 42 is realized by the rear gear drive, wherein the operative connection to the crankshaft 18 is realized via a lateral opening on the crankcase 2. Here, the shaft 42 is connected rotationally conjointly to a gearwheel 50 of the rear gear drive, wherein the gearwheel 50 can be driven by the crankshaft of the internal combustion engine 1 via intermediate gears of the rear gear drive. The gearwheel 50 is secured to the shaft 42 by way of fastening elements 47, for example screws.

On the crankcase there is situated an intermediate case 41 which lies over the lateral opening and which is fastened to the lateral wall of the crankcase 2 on the outside of the crankcase. The intermediate case 41 is fastened to the cold side of the internal combustion engine in an angle range from 110° to 160°, as described above for the motor/generator 25. The intermediate case 41 is fastened by way of fastening elements 43, for example screws, to the crankcase.

The shaft 42 is mounted in the intermediate case 41 by way of radial and axial bearings. On opposite face sides 48 of the intermediate case 41 there are provided fastening flanges 44, 45 for the rotationally secured fastening of the cases of the power-outputting and/or power-receiving means 24, 25.

The gearbox-side shaft end 42b of the shaft 42 is connected to the motor/generator 24. The oppositely situated shaft end 42a of the shaft is connected to an expansion machine 25. It is self-evidently also possible for said arrangement to be interchanged, such that the expansion machine 25 would be arranged on the gearbox-side shaft end 42b. The expansion machine 25 is part of a waste heat recovery system for converting waste heat of the combustion machine into utilizable energy by way of a steam circuit, which furthermore comprises the feed pump 26, the distributor valve 27, the bypass valve 28 and the condenser 29, as described above.

The expansion machine 25 and the motor/generator 24 are operatively connected both to one another and to the crankshaft of the internal combustion engine 1 via the rear gear drive.

Figure 5A:
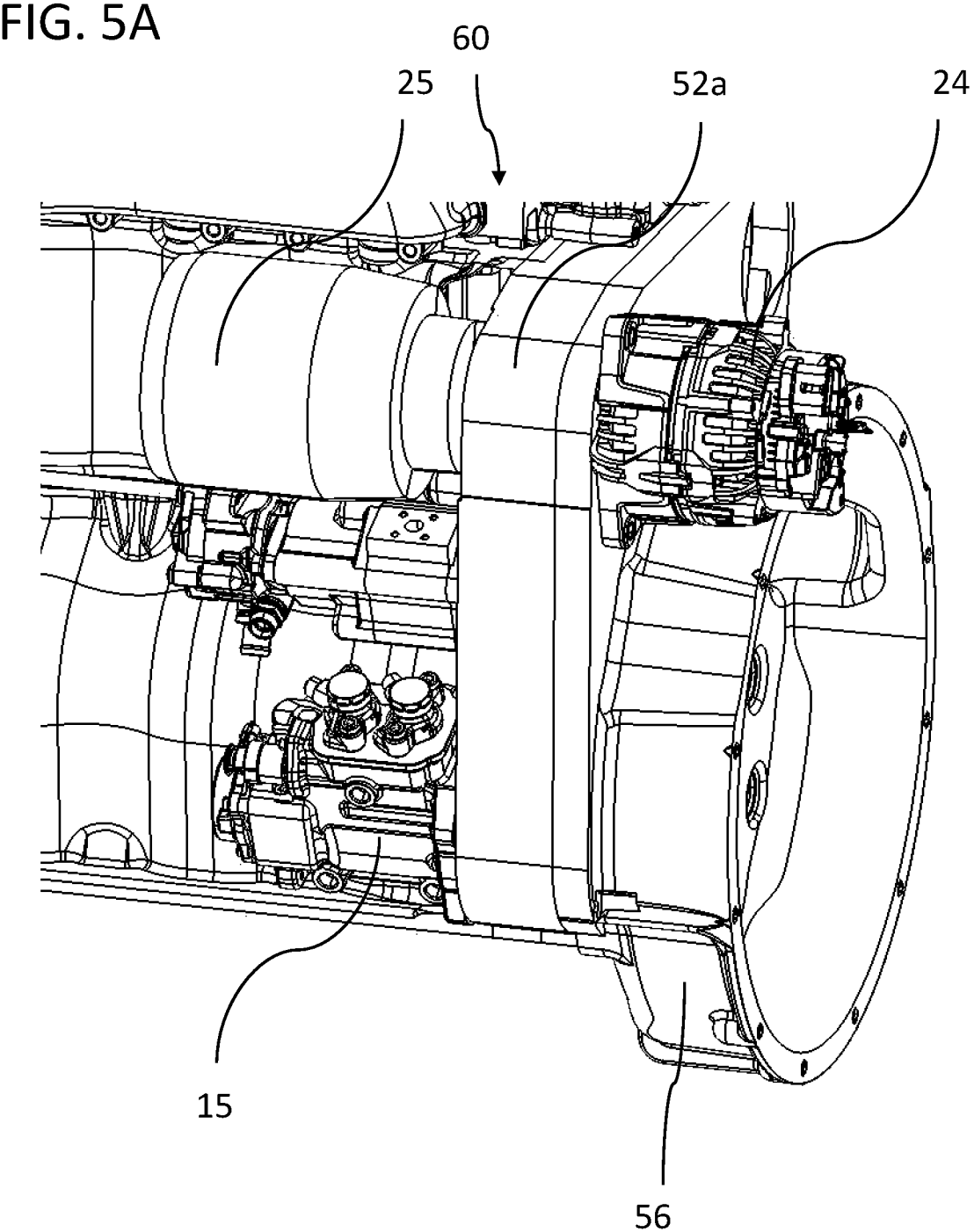
FIGS. 5A and 5B show detail views of an auxiliary drive as per a further embodiment of the present disclosure.
Figure 5B:
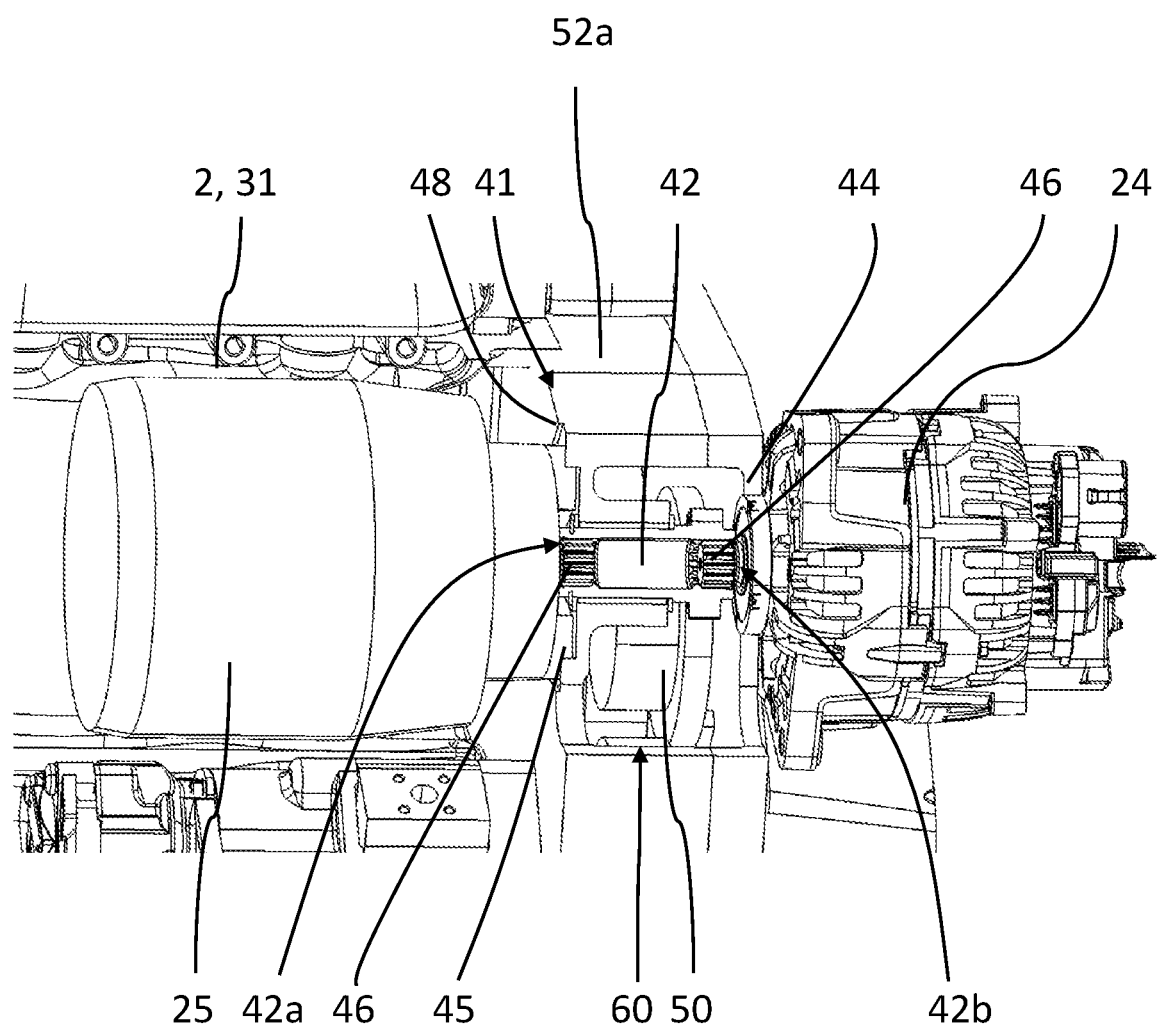

FIGS. 5A and 5B show detail views of an auxiliary drive 60 as per a further embodiment of the present disclosure. FIG. 5A shows a perspective detail view of a lateral rear end region of the combustion machine. The special feature of this embodiment lies in the fact that the shaft 42 of the auxiliary drive 60 is mounted in a case section of the rear control case 52a. For this purpose, the rear control case 52a, which also encases the rear gear drive, is designed to be taller in relation to the control case 52 illustrated in FIG. 2, such that the shaft 42 can be arranged on an upper, outer case section of the control case 52a. The flywheel case is denoted by the reference designation 56.

FIG. 5B shows the auxiliary drive 60 in a sectional view. It has already been mentioned above that the intermediate case 41 may also be part of the rear control case 52a or may be the control case itself. Here, the intermediate case 41, in which the shaft 42 is mounted, is formed as part of the control case 52a. Thus, the mounted shaft 42 and the gearwheel 50 fastened thereto form a part of the rear gear drive. The intermediate case 41 is designed similarly to the intermediate case in FIG. 2. In particular, components with the same reference designations correspond to the components of FIG. 2, and will not be described separately. The gearwheel 50 is secured to the shaft 42 by way of screws.

Even though the present disclosure has been described with reference to particular exemplary embodiments, it is self-evident to a person skilled in the art that numerous changes may be made, and equivalents used as substitutes, without departing from the scope of the present disclosure. Furthermore, numerous modifications may be made without departing from the associated scope. Consequently, the present disclosure is not intended to be restricted to the disclosed exemplary embodiments, but rather is intended to encompass all exemplary embodiments which fall within the scope of the appended patent claims. In particular, the present disclosure also claims protection for the subject matter and the features of the subclaims independently of the claims to which they refer back.

LIST OF REFERENCE DESIGNATIONS

1 Combustion machine, in particular internal combustion engine
2 Crankcase
3 Gearbox side of the internal combustion engine
4 Front face side of the internal combustion engine
5 Topside of the internal combustion engine
6 Belt drive
6a Belt pulley
6b Belt
7 Fan
9 Charge-air duct
10 Drive arrangement
11 Generator
12 Water pump
13 Refrigerant compressor
14 Air compressor
15 High-pressure fuel pump
16 Fuel service module
17 Engine control unit
18 Centreline of the crankshaft
19 Oil sump
20 Drive arrangement 21 Flange
22 Water pump (electrified)
24 Motor/generator 12V, 24V, 48V or high-voltage (e.g. 400V)
25 Expander
26 Feed pump
27 Distributor valve
28 Bypass valve
29 Condenser
30 Vertical plane
31 Cold side of the engine
32 Hot side of the engine
40 Auxiliary drive
41 Intermediate case
42 Internally toothed shaft
42a First end
42b Second end
43 Fastening element
44 Fastening flange
45 Fastening flange
46 Teeth for the shaft-hub connection
47 Fastening element
48 Face side
50 Gearwheel
51 Control case, front
52 Control case, rear
52a Control case, rear
56 Flywheel case
60 Auxiliary drive

We claim:

1. An auxiliary drive of a combustion machine, comprising:
a shaft which is operatively connected to a crankshaft of the combustion machine and which has two shaft ends which are configured for connection to a power-outputting or power-receiving machine arranged outside the crankcase, such that in a connected state the two machines are arranged in alignment with each other at opposite ends of the shaft.

2. The auxiliary drive according to claim 1, wherein the auxiliary drive has an intermediate case in which the shaft is mounted, and wherein the intermediate case is fastened to the crankcase or is formed as part of the crankcase.

3. The auxiliary drive according to claim 1, wherein a power take-off has an intermediate case in which the shaft is mounted, wherein the intermediate case is fastened to a control case, in which a gear drive which is operatively connected to the combustion machine is arranged, or said intermediate case is formed as part of the control case.

4. The auxiliary drive according to claim 1, wherein the shaft is mounted in a case section of the crankcase.

5. The auxiliary drive according to claim 1, wherein the shaft is mounted in a case section of a control case in which a rear gear drive which is operatively connected to the combustion machine.

6. The auxiliary drive according to claim 2, wherein the shaft is mounted in the intermediate case or in a case section by way of at least one radial and/or at least one axial bearing.

7. The auxiliary drive according to claim 2, wherein on opposite face sides of the intermediate case or of a case section, there is provided a fastening interface for the rotationally secured fastening of a case of the power-outputting or power-receiving machine.

8. The auxiliary drive according to claim 1, wherein one of the two shaft ends is connected to an expansion machine.

9. The auxiliary drive according to claim 1, wherein one of the two shaft ends is connected to an electric machine which is operable as a motor and as a generator.

10. The auxiliary drive according to claim 1, wherein both shaft ends are connected to an electric machine which is operable as a generator and as a motor.

11. The auxiliary drive according to claim 6, wherein an expansion machine is part of a waste heat recovery system for converting waste heat of the combustion machine or of an engine braking system into utilizable energy.

12. The auxiliary drive according to claim 1, wherein the shaft is arranged on a cold side of the combustion machine.

13. The auxiliary drive according to claim 1, wherein as viewed in the direction of the combustion machine from a face side of the combustion machine and proceeding upward clockwise from an angle of 0° at the bottom side of the crankcase, the shaft is arranged in an angle range from 110° to 160° or from 200° to 250°.

14. The auxiliary drive according to claim 1, wherein an axis of rotation of the shaft runs parallel to an axis of the crankshaft of the combustion machine.

15. The auxiliary drive according to claim 1, wherein the shaft ends have, for the connection to the power-outputting or power-receiving machine, one of the following connection elements: a connecting flange, internal teeth, external teeth, a frustum, a splined shaft profile, a toothed shaft profile or some other shaft-hub connection.

16. The auxiliary drive according to claim 1, wherein the shaft is connected rotationally conjointly to a gearwheel, wherein the gearwheel can be driven by the crankshaft of the combustion machine via intermediate gears.

17. The auxiliary drive according to claim 1, wherein the shaft is operatively connected via a gear drive to the crankshaft, and wherein the gear drive is arranged on a gearbox-side end region of the combustion machine.

18. The auxiliary drive according to claim 1, wherein the shaft is operatively connected via a gear drive to the crankshaft, and the gear drive is operatively connected to at least one of the following devices: a steering assistance pump, a camshaft drive input, a high-pressure fuel pump, a further auxiliary drive (power take-off) and/or an oil pump.

* * * * *